UNITED STATES PATENT OFFICE.

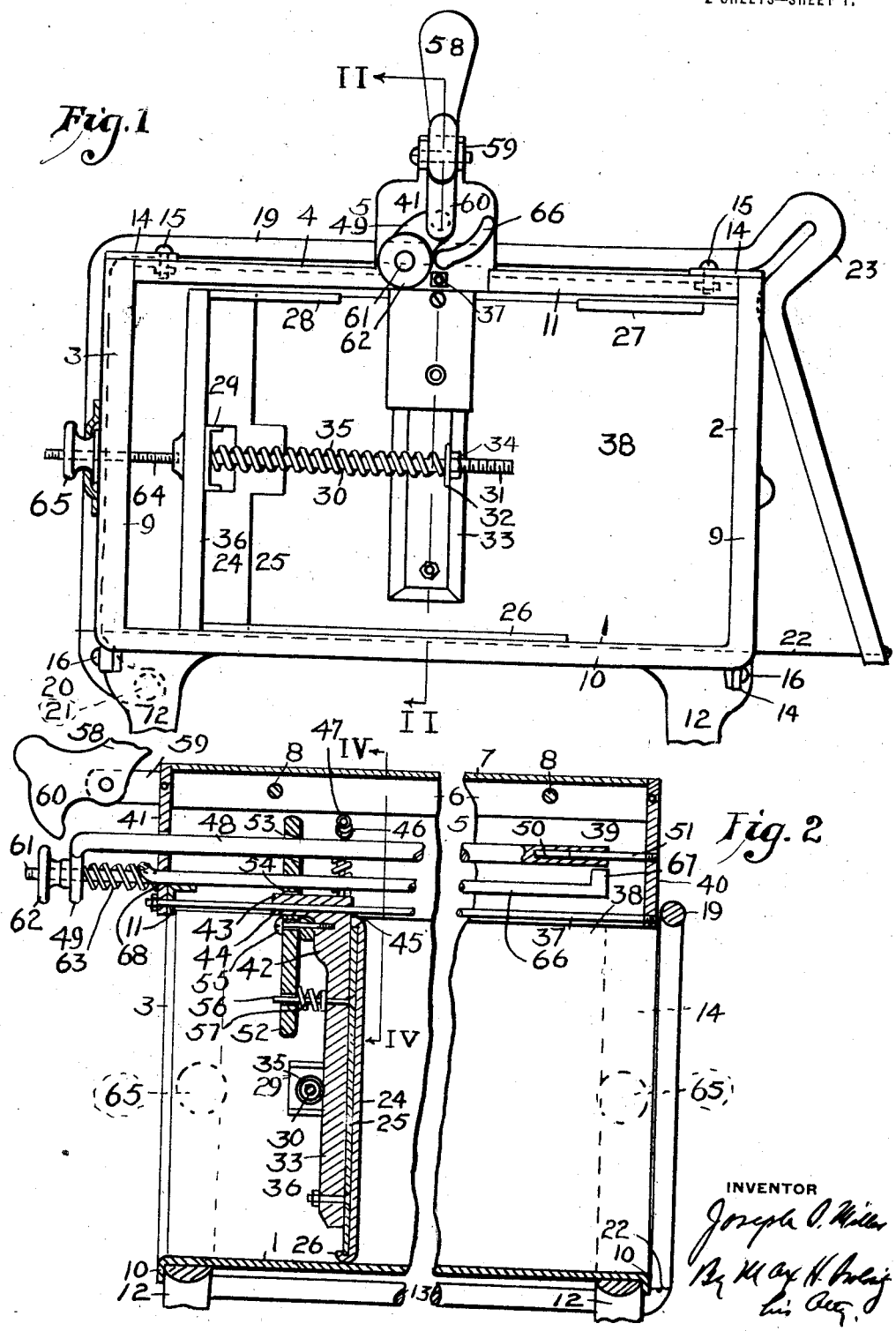

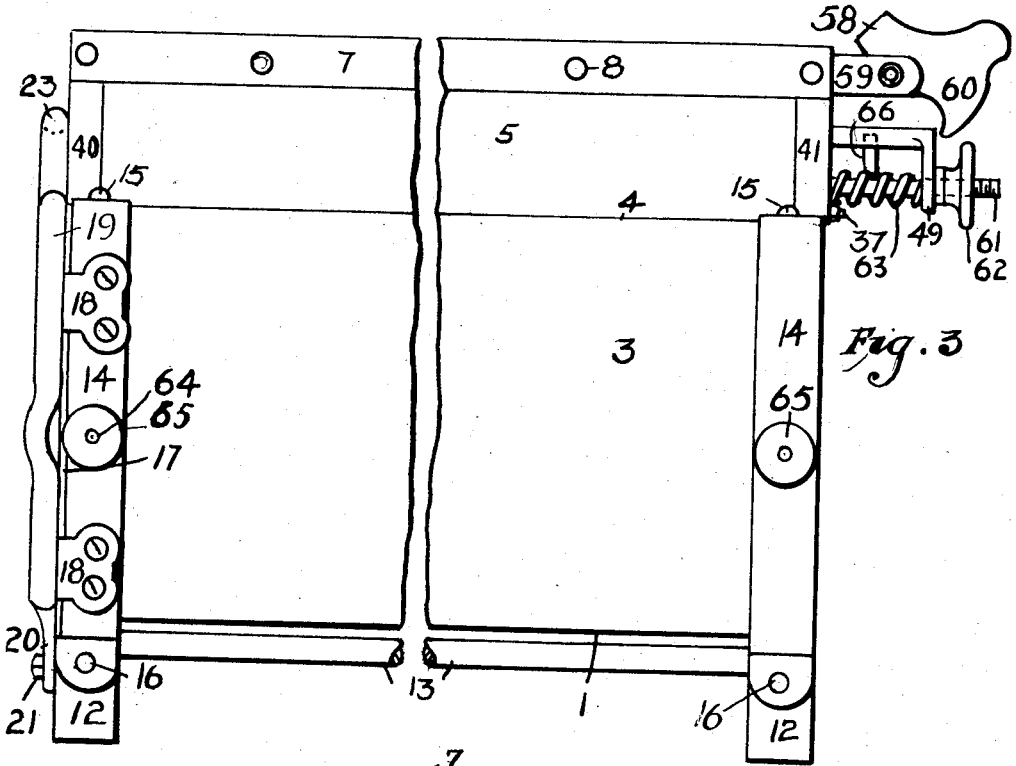
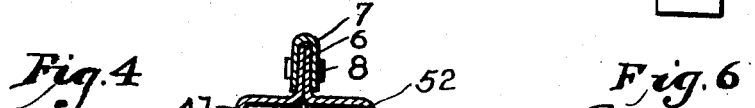
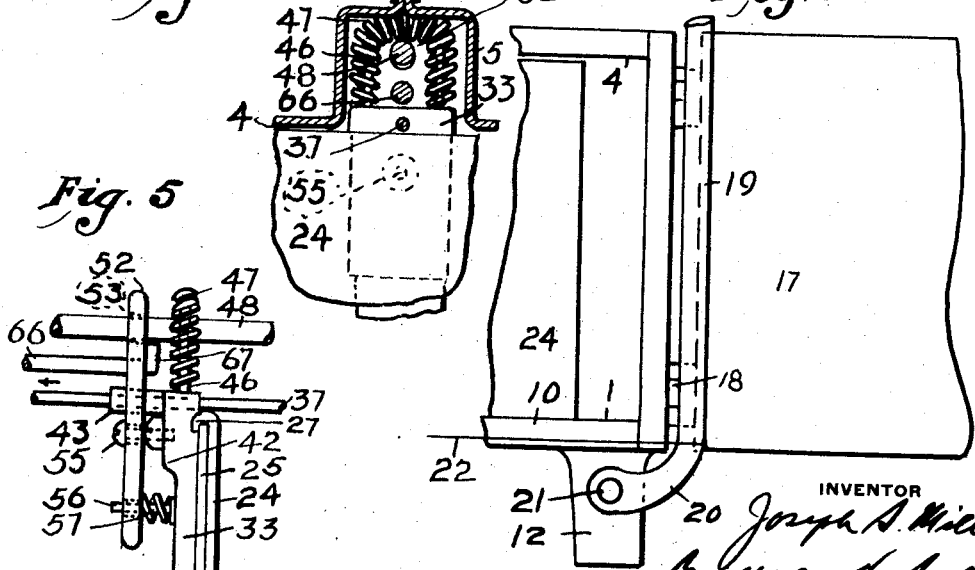

JOSEPH S. MILLER, OF PITTSBURGH, PENNSYLVANIA.

CHEESE-SLICING MACHINE.

1,265,232.  Specification of Letters Patent.  Patented May 7, 1918.

Application filed October 18, 1916. Serial No. 126,431.

*To all whom it may concern:*

Be it known that I, JOSEPH S. MILLER, a citizen of the United States of America, residing at Mt. Oliver, Pittsburgh, county of Allegheny, and State of Pennsylvania, have invented certain new and useful Improvements in Cheese-Slicing Machines, of which the following is a specification.

This invention relates to cheese slicing machines and has for its object to provide a machine of such character with means in a manner as hereinafter set forth, to provide a perfectly sanitary device.

A further object of the invention is to provide a cheese slicing machine with an intermittently operable cheese block feeding machine having means to provide for an intermittent, pre-determined and uniform length of feed of the cheese block thereby obtaining, when the cheese block is fed into the path of the slicer element, slices of uniform thickness, said means capable of being adjusted prior to the operation of the said mechanism, to provide for uniform slices of any desired thickness.

A further object of the invention is to provide a cheese slicing machine having an intermittently operable cheese block feeding mechanism including an automatically extensible cheese block shifting and follow plate to provide for cheese blocks of various widths.

A further object of the invention is to provide a cheese slicing machine including a receptacle having arranged therein a shifting element for returning the cheese block feeding mechanism to normal position.

A further object of the invention is to provide a cheese slicing machine having operating means for intermittently operable cheese block mechanism, said means having as an element thereof a clutch to maintain said mechanism in the position to which it has been shifted to overcome the sliding of the cheese block during the slicing operation. Said clutch is released by the shifting element referred to in the preceding paragraph, when restoring the feeding mechanism to normal position.

A further object of the invention is to provide a cheese slicing machine with an intermittently operable cheese block feeding mechanism including a guide having means associated therewith to maintain the mechanism stationary during the restoring to normal position of the operating means for said mechanism.

A further object of the invention is to provide a cheese slicing machine which is simple in its construction and arrangement, strong, durable, readily assembled, efficient and convenient in its use, sanitary, and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the claims hereunto appended.

In the drawings wherein like reference characters denote corresponding parts throughout the several views:—

Figure 1 is a rear elevation of a cheese slicing machine in accordance with this invention.

Fig. 2 is a section on line 11—11, Fig. 1, broken away.

Fig. 3 is a side elevation, broken away.

Fig. 4 is a sectional detail of the feeding mechanism, on line IV—IV, Fig. 2.

Fig. 5 is a detail in elevation showing a part of the feeding mechanism and operating mechanism therefor, and further the shifting element for restoring the feeding mechanism to normal position.

Fig. 6 is a front view, broken away, with the door open.

The invention is designed primarily for use in connection with soft cheeses in the form of blocks, for instance such as Limburger, Schweitzer and cream cheese, provision being made for slicing the cheese without the hand of the operator contacting therewith, and provision being further made for keeping the cheese in a fresh condition, and confining the undesirable odor emanating therefrom when the machine is not in use.

Referring to the drawing in detail the machine includes a rectangular receptacle formed from a single length of material bent to provide a bottom 1, a pair of side walls 2, 3, and a top 4. The top 4, centrally thereof, is bent to provide a longitudinally extending arch 5 and the ends of the material from which the receptacle is formed are flanged, as at 6. The flanges abut and are overlapped by a stay piece 7. The flanges 6 and stay piece 7 are fixedly secured together by securing devices 8. The material from which the receptacle is formed consists of a metallic body having the inner and outer face thereof enameled.

The sides 2, 3, at the front and rear of the receptacle, have outwardly extending flanges 9 and the bottom 1 at each end of the receptacle has a depending flange 10. The top 4 at each end thereof is formed with a depending flange 11.

Positioned against the lower face of the bottom 1, at each end, is a pair of supports or feet 12, each pair connected by an integral transverse bar 13, which is arranged adjacent the lower face of the bottom 1. The supports or feet 12 are secured in position by corner brackets 14, these latter being connected with the top 4, as at 15, and with the supports 12, as at 16. The corner brackets 14 and the bars 13 are positioned against the flanges of the side walls and bottom of the receptacle.

The front of the receptacle is closed by a door 17, which is hinged to one of the corner brackets 14, as at 18.

The machine includes a slicer element which consists of a cutter frame 19 having one side formed with an inwardly extending projection 20, at the lower end of said side which is pivotally connected with one of the supports 12 as at 21. A flexible slicer or cutter 22 is connected to the bottom of the frame 20. The frame 20 at one corner is offset as at 23, to provide a handle.

The door is maintained in closed position by a suitable latch, not shown.

The machine includes an intermittently operable cheese block feeding mechanism which consists of an automatically extensible cheese block shifting and follower plate formed of two sections 24, 25; the former is flanged as at 26, 27, and 28 and overlaps the section 25 so that a guiding action is set up when one section is shifted relatively to the other. The rear of the section 24 carries a bracket 29, to which is secured a rod 30 having its inner end sliding through an apertured plate 32, which projects rearwardly from a vertically disposed support 33, which is fixedly secured to the rear of the section 25 and projects above the top edge thereof. Carried by the rod 30 is a nut 34 and mounted upon the rod 30 and interposed between the plate 32 and the bracket 29 is an expansible coiled spring 35 having a normal tendency to shift said sections 24, 25, relatively to each other and in a horizontal direction with respect to the receptacle and furthermore to maintain the section 24 against a partition plate 36 to be hereinafter referred to.

The feeding mechanism further includes a longitudinally extending guide rod 37 which is arranged in the top of the chamber 38 formed by the receptacle and centrally of the chamber 39 formed by the arch 5. The chamber 39 communicates with the chamber 38 centrally thereof, and is closed at one end by a plate 40 and at its other end by a plate 41. The rod 37 is fixedly secured in the bottoms of the plates 40, 41.

The support 33, at the top thereof, has its rear offset as at 42 and above said offset 42, is provided with a rearwardly extending arm 43, the latter is provided with an opening 44 which registers with an opening 45 in the top of the support 33. Through the openings 44, 45, extends the guide rod 37. Carried by the upper end of the support 33 is an inverted yoke 46, provided throughout with a coil spring 47, which has a tendency to bind the support 33 on the guide rod 37 to prevent the shifting of the feeding mechanism after the latter has been moved a predetermined distance by its operating means.

The operating means for the feeding mechanism consists of a longitudinally shiftable spring controlled rod 48 which extends through the plate 41, and has its rear end provided with a depending apertured extension 49, extending at an inclination with respect to the longitudinal vertical plane of the rod. The forward end of the rod 48, which is arranged within the chamber 39, is formed with a pocket 50 in which slides a supporting pin 51 projecting rearwardly from the rear face of the plate 40.

The operating mechanism further includes a clutch plate 52, having an opening 53 in the top thereof with the walls thereof oppositely beveled, and extending through the opening 53 is the rod 48. The plate 52 is also formed with an opening 54 to provide a clearance for the extension 43 and said plate 52 is pivotally supported, as at 55, over the offset 42. Connected to the support 33 and extending through the bottom of the plate 52 is a rod 56 and mounted thereon and interposed between the plate 52 and support 33 is a coil spring 57, the function of which is to maintain the plate 52 in clutching engagement with the rod 48.

The operating mechanism further includes an operating lever 58 which is pivoted in an arm 59 projecting rearwardly from the plate 41 and said operating lever is provided with a nose 60 which, when the lever is operated in one direction, engages with the rear end of the rod 48 and shifts the said rod forward, the latter carrying the feeding mechanism therewith.

Associated with the operating means for the feeding mechanism is a regulating device for controlling the thickness of the slice and which consists of a rearwardly extending arm 61, which projects through the extension 49 and carries on its rear end an adjusting nut 62 having threaded engagement with the arm 61. Mounted upon the arm 61 and interposed between the extension 49 and plate 41 is a coiled spring 63.

The positioning of the nut 62 on the arm 61 regulates the thickness of the slice due to the fact that it regulates the length of movement of the rod 48. When the nut 62 is moved inwardly the spring 63 is compressed and the movement of the rod 48 is decreased, if the nut 62 is moved outwardly on the arm 61 the spring 63 expands and the movement of the rod 48 is increased. The spring 63 also performs the function of returning the rod 48 to normal position.

Arranged within the receptacle is the partition 36 the function of which is to provide for cheese blocks of various widths and said partition 36 has engaging therewith a pair of threaded members 64, which project from the wall 3, and have threaded engagement with the heads of the thumb-nuts 65, these latter being swiveled with the wall 3. When the heads 65, are adjusted the partition is shifted inwardly or outwardly as desired When shifted inwardly it will move the section 24 therewith against the action of spring 35 and if shifted outwardly the expanding of the spring 35 will force the section 24 against the partition 36.

The machine further includes a shifting element consisting of an elongated rod 66 having its inner end provided with a hook 67. The rod 66 extends through an opening 68 in the plate 41 and when the feeding mechanism is desired to be restored to normal position the rod 66 is drawn rearwardly and when the hooked end 67 engages with the clutch plate 53 the latter is shifted free of the bar 58 and the feeding mechanism is shifted to the rear of the receptacle.

What I claim is:—

1. A cheese block slicing machine comprising an intermittently operable cheese block feeding mechanism including an automatically extensible combined shifting and follower plate formed of two sections movable relatively one to the other and having a spring controlled coupling means therebetween.

2. A cheese block slicing machine comprising an intermittently operable cheese block feeding mechanism including an automatically extensible combined shifting and follower plate formed of two sections movable relatively one to the other and having a spring controlled coupling means therebetween, one of said sections being slidable in the other.

3. A cheese slicing machine comprising a cheese block feeding mechanism, and operating means therefor including a reciprocatory actuating bar and a spring controlled clutching element pivotally connected with said mechanism and in normal clutching engagement with said bar, and a longitudinally movable shifting element engaging, when shifted in one direction, said clutching element for releasing the latter and returning said mechanism to normal position.

4. A cheese slicing machine comprising a cheese block feeding mechanism, and operating means therefor including a reciprocatory actuating bar and a spring controlled clutching element pivotally connected with said mechanism and in normal clutching engagement with said bar, and a regulating device associated with said operating means for controlling the movement of said mechanism to regulate the width of the slice and for returning said rod to initial position, and a longitudinally movable shifting element engaging, when shifted in one direction, said clutching element for releasing the latter and returning said mechanism to normal position.

5. A cheese slicing machine comprising a receptacle, a cheese block feeding mechanism arranged in the receptacle and having an automatically extensible combined shifting and follower plate formed of two sections movable relatively one to the other and having a spring controlled coupling means therebetween, and an adjustable partition arranged in the receptacle and permanently engaged by one of said sections of said plates.

6. A cheese slicing machine comprising a receptacle having an arch at the top thereof, an intermittently operable cheese block feeding mechanism within said receptacle, operating means for said mechanism pivotally connected therewith, and means pivotally supported from said arch for throwing said operating means into operation.

7. A cheese slicing machine comprising a receptacle having an arch at the top thereof, an intermittently operable cheese block feeding mechanism within said receptacle, operating means for said mechanism pivotally connected therewith, a longitudinally movable rod for shifting said operating means, means pivotally supported from said arch for actuating said rod, and means for controlling the movement of said rod to provide for slices of uniform thickness.

8. A cheese slicing machine comprising a receptacle having an arch at the top thereof, an intermittently operable cheese block feeding mechanism within said receptacle, operating means for said mechanism pivotally connected therewith, a longitudinally movable rod for shifting said operating means, means pivotally supported from said arch for actuating said rod, and a longitudinally movable shifting element capable of engaging the said operating means for restoring said mechanism to normal position when said shifting element is moved rearwardly.

9. A cheese slicing machine comprising a receptacle having an arch at the top thereof, an intermittently operable cheese block feeding mechanism within said receptacle, operating means for said mechanism pivotally connected therewith, a longitudinally movable rod for shifting said operating means, means pivotally supported from said arch for actuating said rod, and means for controlling the movement of said rod to provide for slices of uniform thickness, and a longitudinally movable shifting element capable of engaging the said operating means for restoring said mechanism to normal position when said shifting element is moved rearwardly.

10. A cheese slicing machine comprising a receptacle provided with supports at the front and rear thereof, means for intermittently shifting a cheese block forwardly in said receptacle to position it in the path of a slicer, a frame having one side pivotally connected to one of said front supports, and a flexible slicing element connected to the sides of said frame, and a rearwardly shiftable element for releasing said means to move the latter to normal position.

In testimony whereof I affix my signature in the presence of two witnesses.

JOSEPH S. MILLER.

Witnesses:
MAX H. SROLOVITZ,
LUELLA H. SIMON.